United States Patent Office 2,921,434
Patented Jan. 19, 1960

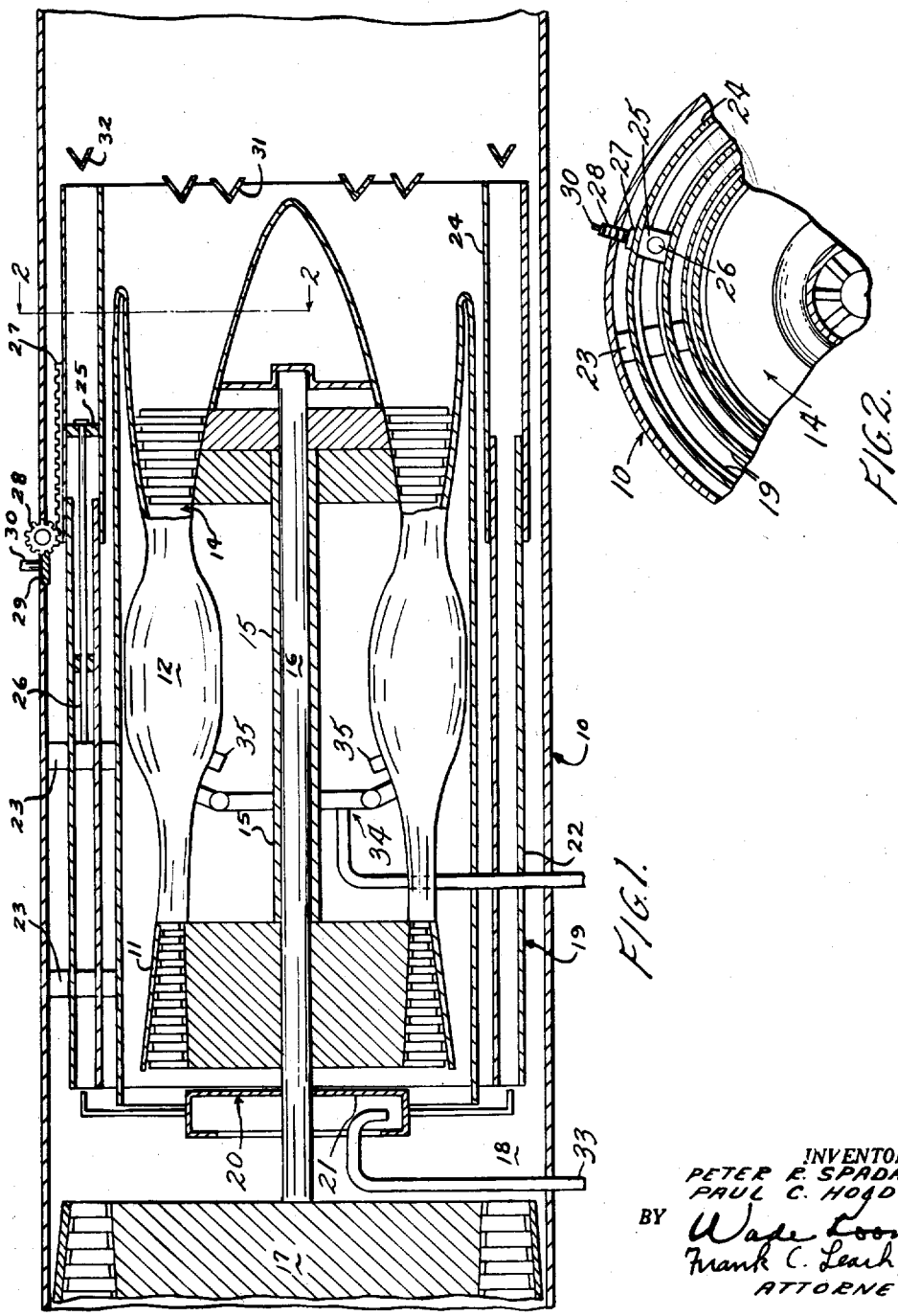

2,921,434

VARIABLE THRUST GAS TURBINE ENGINE

Peter Ralph Spadaro, Prairie Village, and Paul C. Holden, Mission, Kans., assignors, by mesne assignments, to the United States of America as represented by the Secretary of the Air Force Application May 21, 1957, Serial No. 660,726

7 Claims. (Cl. 60—35.6)

This invention relates to gas turbine engines and, more particularly, relates to the gas turbine engine of the bypass type.

In a bypass type engine, a portion of the air entering the engine is diverted into a duct so that the air bypasses the compressor, the combustion stage, and the turbine. The compressor section, which is bypassed by the air flowing through the duct, is usually a high pressure compressor section that cooperates with a low pressure compressor section through which all of the air passes. This is accomplished by driving the high pressure compressor section by the high speed portion of the turbine while the low pressure compressor section is driven by the low speed portion of the turbine.

In a bypass duct, fuel may be supplied to be mixed with the air so that the fuel and air are readily mixed by the time that the mixture flows from the bypass duct into the engine in the afterburner section rearward of the turbine. The ratio of the fuel and air determines the amount of thrust produced by the fuel flowing through the duct.

One problem with bypass gas turbine engines is regulation of the thrust. The present invention satisfactorily solves this problem by providing a device for regulating the thrust supplied by the fuel flowing through the bypass duct.

An object of this invention is to provide a device for changing the thrust produced by the fuel flowing through the bypass duct of a bypass gas turbine engine.

Other objects of this invention will be readily perceived from the following description, taken in connection with the accompanying drawings, in which like reference characters refer to like parts in the figures.

This invention relates to a bypass gas turbine engine comprising a compressor, a combustion stage, a turbine, and a bypass duct to divert a portion of the air entering the engine around the compressor, the combustion stage, and the turbine. The bypass duct is divided into separate portions with fuel supplied to one of the portions. A plurality of flameholders are disposed adjacent the outlet of the bypass duct to stabilize the ignition of fuel flowing therefrom. The distance between the flameholders and the end of the portion of the duct to which the fuel is supplied is varied to vary the thrust of the engine by varying the fuel air ratio at the flameholders.

Fig. 1 is a longitudinal sectional view, partly in elevation, of the preferred embodiment of the present invention.

Fig. 2 is a partly broken away, cross sectional view taken about on line 2—2 of Fig. 1 illustrating additional details of the inventive device.

Referring to Figs. 1 and 2 of the drawings, there is shown a gas turbine engine 10 of the bypass type having a high pressure compressor section 11, a combustion stage 12, and a turbine 14. A shaft 15 connects the high pressure compressor section 11 to the high pressure portion of the turbine 14 whereby the compressor is driven. A shaft 16, which is disposed inside of the shaft 15, is connected to the low pressure portion of the turbine 14 and a low pressure compressor 17 to drive the low pressure compressor. All of the air entering the engine passes through the low pressure compressor 17 after which a portion flows through the high pressure compressor 11, the combustion stage 12, and the turbine 14 to the exhaust. The remainder of the air entering the compressor 17 is diverted into an annular bypass duct 18 by spacing the inlet end of the bypass duct 18 from the compressor 17. The aforesaid combustion stage 12 comprises a plurality of combustion chambers supplied with fuel by means of the feed pipe assembly indicated partly broken away at 34 and ignited by means of igniters schematically indicated at 35.

An annular duct 19 is disposed within the duct 18 to divide the duct 18 into three separate portions. Fuel is supplied into the annular duct 19, which forms one of the portions of the duct 18, by a fuel slinger 20, which is secured to the shaft 16 to rotate therewith. A fuel feed pipe indicated partly broken away at 33 is adaptable for connection to a source of fuel supply in order to feed fuel to the fuel slinger 20. It will be understood that the fuel slinger 20, which comprises a plurality of rotating rods 21, could be secured to the compressor 11, if desired. The fuel slinger 20 is disposed at the inlet end of the inner annular duct 19. The inlet end of the duct 19 is spaced from the inlet end of the duct 18 whereby the air readily flows into the three portions of the duct 18.

The duct 19 includes a fixed portion 22, which is supported by a plurality of strut members or short columns 23, and a movable portion 24. The movable portion 24 is slidably mounted on a plurality of relatively elongated rods 26 (one shown), which are secured to some of the strut members or short columns 23, by means of the support members 25 (one shown) which are rigidly secured at opposite ends between the wall surfaces of the movable portion 24. The movable portion 24 of the inner annular duct 19 has a rack 27 thereon in engagement with a gear 28. The gear 28 meshes with a gear 29 connected to an actuating member 30. Through the gears 29 and 28, the actuating member 30 moves the rack 27 to move the movable portion 24 of the duct 19.

A plurality of flameholders 31 are mounted adjacent the exhaust of the turbine 14 to produce stabilized afterburning in the engine. Similar flameholders 32 are disposed adjacent the outlet end of the movable portion 24 of the duct 19 to stabilize the ignited mixture of fuel and air flowing therethrough. When the outlet end of the movable portion 24 is adjacent the flameholders 32 as shown in the single figure of the drawing, there is very litle mixing of the fuel and air flowing through the inner duct 19 with the air flowing through the remainder of the duct 18. Thus, the thrust produced at the position shown in the drawing is a minimum. As the outlet end of the movable portion 24 is moved away from the flameholders 32 by the actuating member 30, there is an increased mixing of the air within the portion of the duct 18, which is formed between the duct 19 and the duct 18, with the fuel air mixture flowing from the inner duct 19. When the movable portion 24 has moved its maximum distance from the flameholders 32, the greatest thrust is produced by the fuel flowing through the inner duct 19 since the fuel-air ratio is at a maximum. Thus, it will be observed that variation of the distance between the flameholders 32 and the outlet end of the movable portion 24 of the duct 19 determines the thrust produced by the fuel injected into the inner duct 19. The desired location of the maximum distance of the outlet end of the movable portion 24 from the flameholders 32 is such that there is practically complete mixing of the fuel and air in the duct 19 with the air flowing through the remainder of the duct 18. The fuel-air mixture emitting from the duct 19 is ignited on its mixture with the products of combustion exhausting or flowing from the combustion chambers 12 under pressure.

While the inner duct 19 has been moved with respect to the flameholders 32, it will be understood that it is only necessary to vary the distance between the flameholder and the outlet end of the duct through which the fuel flows in order to vary the fuel mixture ratio. Thus, the inner duct 19 could be made completely stationary and the flameholders 32 movable, if desired.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

I claim:

1. A bypass gas turbine engine comprising a compressor, a combustion stage, a turbine, a bypass duct to divert a portion of the air entering the engine around the compressor, the combustion stage and the turbine, means dividing the bypass duct into separate portions, means to supply fuel to one of said portions forming a mixture of fuel and air, said mixture being ignited at the outlet of said one portion, a plurality of flameholders disposed adjacent the outlet of the bypass duct to stabilize the ignited mixture of fuel and air flowing therefrom, and means to vary the distance between the flameholders and the end of said one portion of the bypass duct to vary the thrust of the engine by varying the fuel-air ratio at the flameholders.

2. A bypass gas turbine engine comprising a compressor, a combustion stage, a turbine, an annular bypass duct to divert a portion of the air entering the engine around the compressor, the combustion stage, and the turbine, an annular duct disposed within the bypass duct, means to supply fuel to said inner annular duct, forming a mixture of fuel and air, said mixture being ignited at the outlet of said inner annular duct, a plurality of flameholders disposed adjacent the outlet of the inner annular duct to stabilize the ignited mixture of fuel and air flowing therefrom, and means to vary the distance between the flameholders and the outlet end of said inner annular duct to vary the thrust to the engine by varying the fuel-air ratio at the flameholders.

3. A bypass gas turbine engine comprising a compressor, a combustion stage, a turbine, an annular bypass duct to divert a portion of the air entering the engine around the compressor, the combustion stage, and the turbine, an annular duct disposed within the bypass duct, said inner annular duct including a fixed portion and a movable portion, means to supply fuel to the fixed portion forming a mixture of fuel and air, said mixture being ignited at the outlet of said inner annular duct, a plurality of flameholders disposed adjacent the outlet end of the movable poriton of the inner annular duct to stabilize the ignited mixture of fuel and air flowing therefrom, and means to move the movable portion of the inner annular duct to vary the distance from the end of the movable portion to the flameholders to vary the thrust of the engine by varying the fuel-air ratio at the flameholders.

4. A bypass gas turbine engine comprising a first compressor, a second compressor spaced from the first compressor, a combustion stage, a turbine, a bypass duct communicating with the space between the compressors to receive from the first compressor a portion of the air compressed therein to divert the air around the second compressor, the combustion stage, and the turbine, means dividing said bypass duct into separate portions, means to supply fuel to one of said portions forming a mixture of fuel and air, said mixture being ignited at the outlet of said one portion, a plurality of flameholders disposed adjacent the outlet of the bypass duct to stabilize the ignited mixture of fuel and air flowing therefrom, and means to vary the distance between the flameholders and the end of said one portion of the bypass duct to vary the thrust of the engine by varying the fuel-air ratio at the flameholders.

5. A bypass gas turbine engine comprising a first compressor, a second compressor spaced from the first compressor, a combustion stage, a turbine, an annular bypass duct communicating with the space between the compressors to receive from the first compressor a portion of the air compressed therein to divert the air around the second compressor, the combustion stage, and the turbine, an annular duct disposed within the annular bypass duct, the inlet end of said inner annular duct being spaced from the air inlet end of the bypass duct, means to supply fuel to the inlet end of said inner annular duct forming a mixture of fuel and air, said mixture being ignited at the outlet of said inner annular duct, a plurality of flameholders disposed adjacent the outlet end of the inner annular duct to stabilize the ignited mixture of fuel and air flowing therefrom, and means to vary the distance between the flameholders and the outlet end of the inner annular duct to vary the thrust of the engine by varying the fuel-air ratio at the flameholders.

6. A bypass gas turbine engine comprising a first compressor, a second compressor spaced from the first compressor, a combustion stage, a turbine, an annular bypass duct communicating with the space between the compressors to receive from the first compressor a portion of the air compressed therein to divert the air around the second compressor, the combustion stage, and the turbine, an annular duct disposed within the annular bypass duct, said inner annular duct including a fixed portion and a movable portion, means to supply fuel to the inner annular duct forming a mixture of fuel and air, said mixture being ignited at the outlet of said inner annular duct, a plurality of flameholders disposed adjacent the outlet end of the inner annular duct to stabilize the ignited mixture of fuel and air flowing therefrom, and means to move the movable portion of the inner annular duct to vary the distance from its outlet end to the flameholders to vary the thrust of the engine by varying the fuel-air ratio at the flameholders.

7. A bypass gas turbine engine comprising a first compressor, a second compressor spaced from the first compressor, a combustion stage, a turbine, an annular bypass duct communicating with the space between the compressors to receive from the first compressor a portion of the air compressed therein to divert the air around the second compressor, the combustion stage, and the turbine, an annular duct disposed within the annular bypass duct, said inner annular duct including a fixed portion and a movable portion, the inlet end of said inner annular duct being spaced from the air inlet of the bypass duct, means to supply fuel to the inlet end of the inner annular duct forming a mixture of fuel and air, said mixture being ignited at the outlet of said inner annular duct, a plurality of flameholders disposed adjacent the outlet end of the inner annular duct to stabilize the ignited mixture of fuel and air flowing therefrom, and means to move the movable portion of the inner annular duct to vary the distance from its outlet end to the flameholders to vary the thrust of the engine by varying the fuel-air ratio at the flameholders.

References Cited in the file of this patent

UNITED STATES PATENTS

| | | |
|---|---|---|
| 2,504,181 | Constant | Apr. 18, 1950 |
| 2,770,096 | Fox | Nov. 13, 1956 |

OTHER REFERENCES

Serial No. 367,666, Anixonnaz et al. (A.P.C.), published May 25, 1943. (Corresponding U.S. Patent No. 2,396,911, issued March 19, 1946.)